(12) United States Patent
Ye et al.

(10) Patent No.: US 11,417,104 B2
(45) Date of Patent: Aug. 16, 2022

(54) SYSTEMS AND METHODS FOR AUTOMATICALLY DETERMINING LOCATION OF AN OBJECT INSIDE A RETAIL STORE

(71) Applicant: Walmart Apollo, LLC, Bentonville, AR (US)

(72) Inventors: Yanbin Ye, Bentonville, AR (US); Zhichun Xiao, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 95 days.

(21) Appl. No.: 17/087,432

(22) Filed: Nov. 2, 2020

(65) Prior Publication Data

US 2021/0133860 A1 May 6, 2021

Related U.S. Application Data

(60) Provisional application No. 62/929,311, filed on Nov. 1, 2019.

(51) Int. Cl.
*G06Q 30/06* (2012.01)
*G06V 20/52* (2022.01)
(Continued)

(52) U.S. Cl.
CPC ......... *G06V 20/52* (2022.01); *G06Q 30/0261* (2013.01); *G06T 1/00* (2013.01);
(Continued)

(58) Field of Classification Search
CPC ...... G06Q 30/06; G06Q 30/0601–0643; G06Q 30/0261; G06Q 30/0639; G06Q 30/0259;
(Continued)

(56) References Cited

U.S. PATENT DOCUMENTS 7,996,256 B1 8/2011 Anand
8,878,937 B2 11/2014 Golan
(Continued)

OTHER PUBLICATIONS

Competing in the Age of Omnichannel Retailing. Erik Brynjolfsson. Yu Jeffery Hu. Mohammad S. Rahman. MIT Sloan Management Review. May 2013. (Year: 2013).*
(Continued)

*Primary Examiner* — William J Allen
(74) *Attorney, Agent, or Firm* — Fitch, Even, Tabin & Flannery LLP (57) ABSTRACT

In some embodiments, apparatuses and methods are provided herein useful to automatically determining location of an object. In some embodiments, there is provided a system for automatically determining location of an object inside a retail store via one or more cameras including: a plurality of locations inside a retail store; a first camera capturing a first image of a first location; a portable electronic device configured to transmit a signal used to determine an absolute location of a test object; one or more first receiver circuits configured to receive transmitted first signals from the portable electronic device; and a control circuit configured to: associate a first set of store coordinates of a first coordinate system associated with an entire area inside the retail
(Continued)

store with a first set of frame coordinates of a second coordinate system associated with the plurality of cameras; and cause a database to store the association.

20 Claims, 5 Drawing Sheets

(51) Int. Cl.
  *H04N 7/18* (2006.01)
  *G06Q 30/02* (2012.01)
  *H04N 13/246* (2018.01)
  *G06T 1/00* (2006.01)
  *G06V 10/24* (2022.01)
(52) U.S. Cl.
  CPC ........... *H04N 7/181* (2013.01); *H04N 13/246* (2018.05); *G06V 10/245* (2022.01)
(58) Field of Classification Search
  CPC .. G06T 7/292; H04N 17/002; G06K 9/00771; G06K 2209/27; G06K 2009/3225; G06K 9/3216; G06V 20/10; G06V 20/20; G06V 20/50; G06V 20/52; G06V 20/64; G06V 20/647; G06V 20/653; G01C 21/206
  See application file for complete search history.

(56) References Cited

U.S. PATENT DOCUMENTS

| | | |
|---|---|---|
| 9,165,190 B2 | 10/2015 | Zhang |
| 9,218,061 B2 | 12/2015 | Majumder |
| 9,569,786 B2 | 2/2017 | Shaw |
| 9,906,918 B2 | 2/2018 | Ozkan |
| 2007/0150097 A1* | 6/2007 | Chae .................... G05D 1/0234 700/245 |
| 2011/0122257 A1* | 5/2011 | Kirk .......................... G01S 5/16 348/E17.002 |
| 2013/0045751 A1 | 2/2013 | Chao |
| 2013/0166193 A1* | 6/2013 | Goldman ............. G01C 21/165 701/445 |
| 2014/0172476 A1 | 6/2014 | Goulart |
| 2015/0094089 A1* | 4/2015 | Moeglein ............. G01C 25/005 455/456.1 |

OTHER PUBLICATIONS

Ray, B.; "How an Indoor Positioning System Works"; https://www.airfinder.com/blog/indoor-positioning-system; Aug. 16, 2018; pp. 1-11.

* cited by examiner

SYSTEMS AND METHODS FOR AUTOMATICALLY DETERMINING LOCATION OF AN OBJECT INSIDE A RETAIL STORE

CROSS-REFERENCE TO RELATED APPLICATION

This application claims the benefit of U.S. Provisional Application No. 62/929,311 filed Nov. 1, 2019, which is incorporated herein by reference in its entirety.

TECHNICAL FIELD

This invention relates generally to automatically determining location of an object.

BACKGROUND

Generally, to determine whether there is a customer in an aisle or an area in a retail store, an associate would have to go to that aisle or that area to verify that there is a customer. Alternatively, if there is a monitoring camera installed in that aisle or area, the associate may just look at a display attached to the camera and verify that there is a customer.

BRIEF DESCRIPTION OF THE DRAWINGS

Disclosed herein are embodiments of systems, apparatuses and methods pertaining to automatically determining location of an object inside a retail store. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for automatically determining location of an object inside a retail store via one or more cameras. By one approach, a system may include a plurality of locations inside a retail store. In one configuration, the system may include a first camera of a plurality of cameras capturing, at a first time, a first image of a first location of the plurality of locations. Alternatively or in addition to, the system may include a portable electronic device associated with a test object. In some implementation, the portable electronic device may transmit a signal used to determine an absolute location of the test object inside the retail store during a setup phase. Alternatively or in addition to, the system may include one or more first receiver circuits of a plurality of receiver circuits distributed inside the retail store. By one approach, the one or more first receiver circuits may receive transmitted first signals from the portable electronic device during the setup phase when the test object is at the first location at the first time. In one scenario, the one or more first receiver circuits may be associated with the first location.

By another approach, the system may include a control circuit communicatively coupled to the first camera and the one or more first receiver circuits. In some configurations, during the setup phase and the portable electronic device being at the first location, the control circuit may associate, using the first image from the first camera and data from at least one of the one or more first receiver circuits having received the transmitted first signals from the portable electronic device when the first object is at the first location, a first set of store coordinates of a first coordinate system associated with an entire area inside the retail store with a first set of frame coordinates of a second coordinate system associated with the plurality of cameras. In such a configuration, the first set of frame coordinates may be associated with a first frame of the first camera. Alternatively or in addition to, the control circuit may cause a database to store the association of the first set of store coordinates of the first coordinate system with the first set of frame coordinates of the second coordinate system to subsequently allow the control circuit during an operational phase to automatically determine the absolute location of a moving object inside the retail store. In some implementations, the absolute location of a moving object inside the retail store may be automatically determined by performing a lookup in the database of the absolute location of the moving object using a pixel location corresponding to the moving object in a frame of a particular camera associated with a current location of the moving object in the retail store.

In some embodiments, a method for automatically determining location of an object inside a retail store via one or more cameras may include capturing, at a first time by a first camera of a plurality of cameras, a first image of a first location of a plurality of locations inside a retail store. Alternatively or in addition to, the method may include transmitting, by a portable electronic device associated with a test object, a first signal used to determine an absolute location of the test object inside the retail store during a setup phase. By one approach, the method may include receiving, at one or more first receiver circuits of a plurality of receiver circuits distributed inside the retail store, the transmitted first signal from the portable electronic device during the setup phase that the test object is at the first location at the first time. For example, the one or more first receiver circuits may be associated with the first location. By another approach, the method may include associating at a control circuit communicatively coupled to the first camera and the one or more first receiver circuits, using the first image from the first camera and data from at least one of the one or more first receiver circuits having received the transmitted first signals from the portable electronic device when the test object is at the first location, a first set of store coordinates of a first coordinate system associated with an entire area inside the retail store with a first set of frame coordinates of a second coordinate system associated with the plurality of cameras. In some configuration, the first set of frame coordinates may be associated with a first frame of the first camera. Alternatively or in addition to, the method may include causing, by the control circuit, a database to store the association of the first set of store coordinates of a first coordinate system with the first set of frame coordinates of the second coordinate system to subsequently allow the control circuit during an operational phase to automatically determine the absolute location of a moving object inside the retail store by performing a lookup in the database of the absolute location of the moving object using a pixel location corresponding to the moving object in a frame of a particular camera associated with a current location of the moving object in the retail store.

Figure 1:
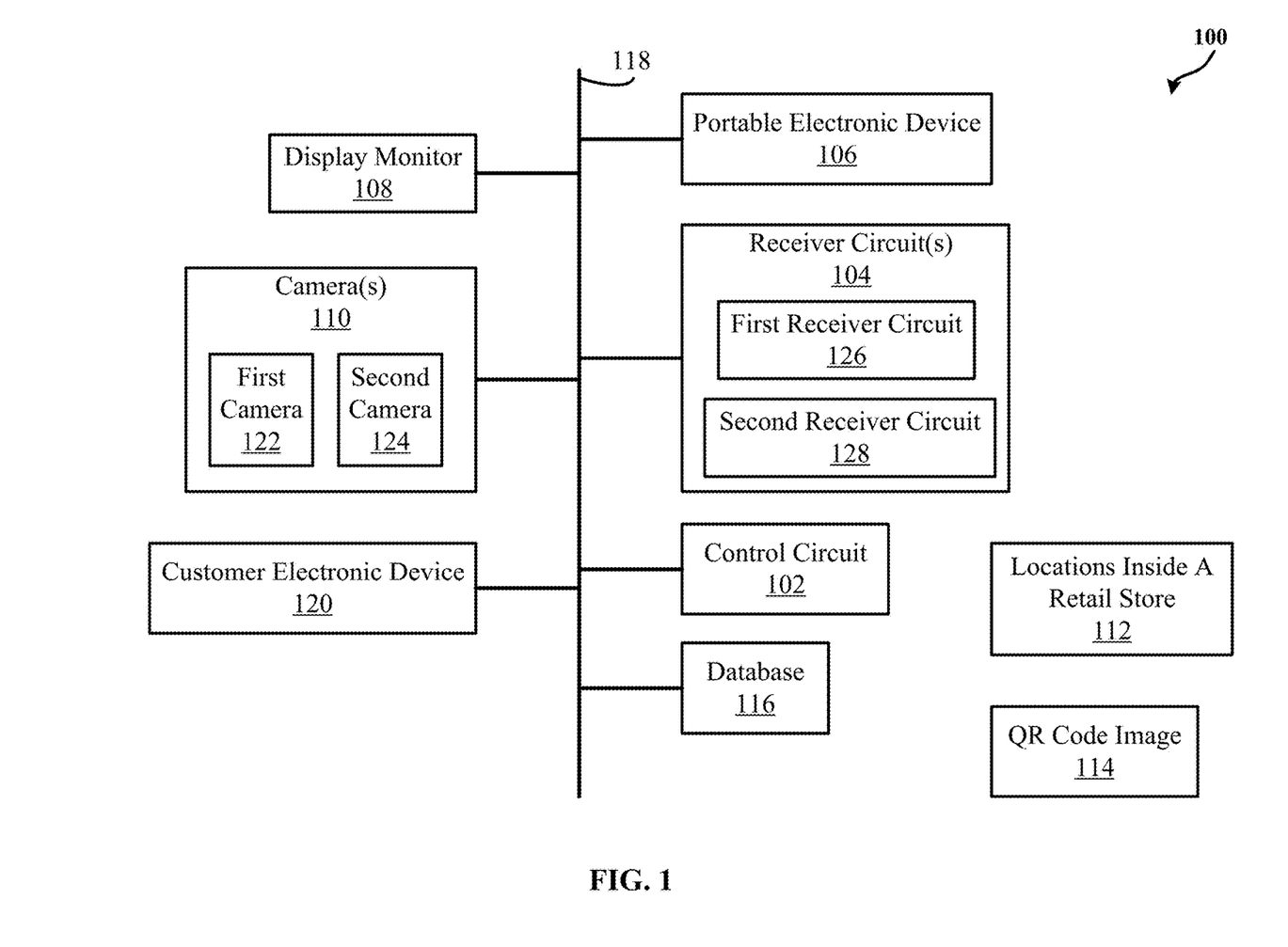
FIG. 1 illustrates a simplified block diagram of an exemplary system for automatically determining location of an object inside a retail store in accordance with some embodiments.
Figure 2:
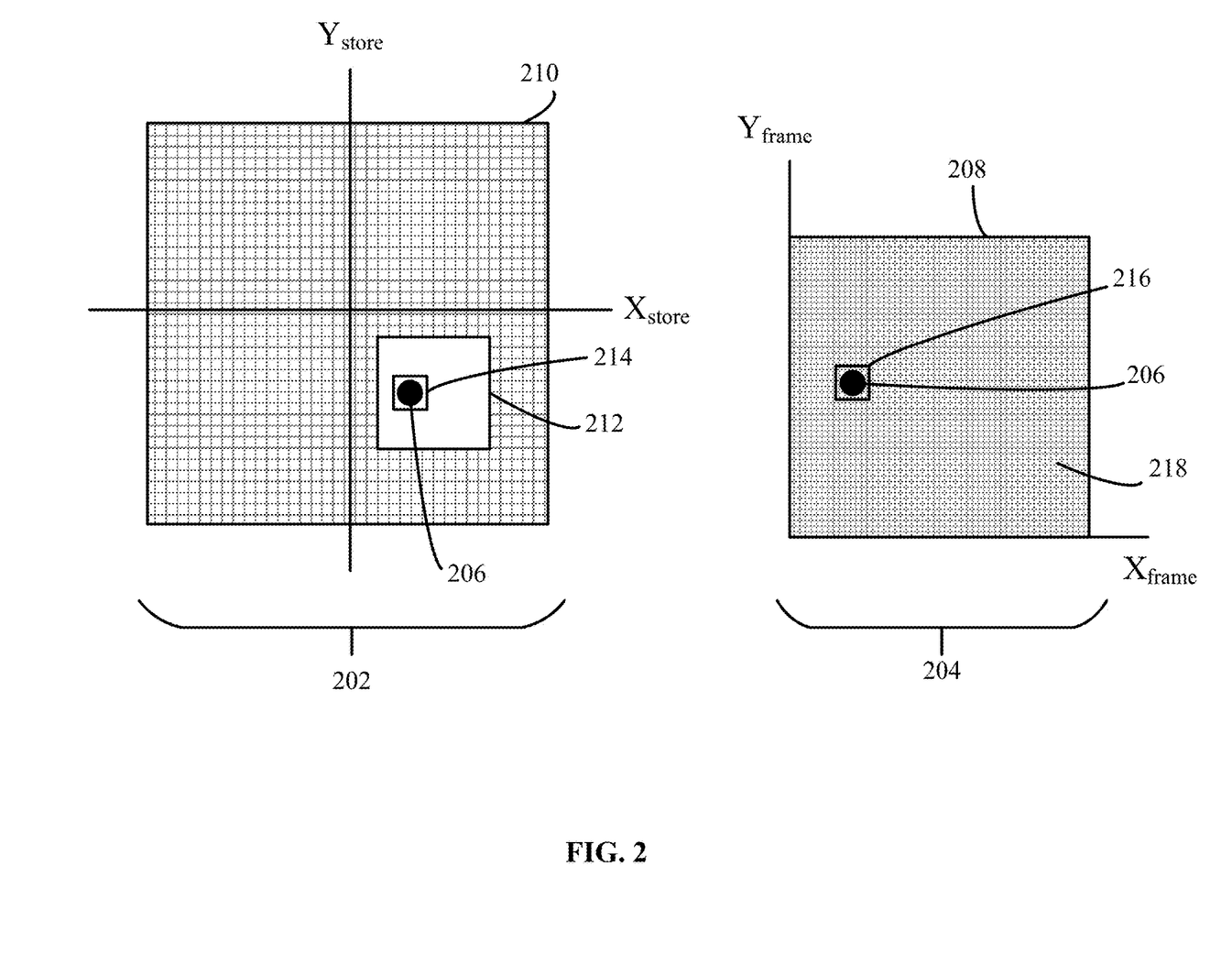
FIG. 2 is a simplified schematic illustration of exemplary coordinate systems in accordance with some embodiments.
Figure 3:
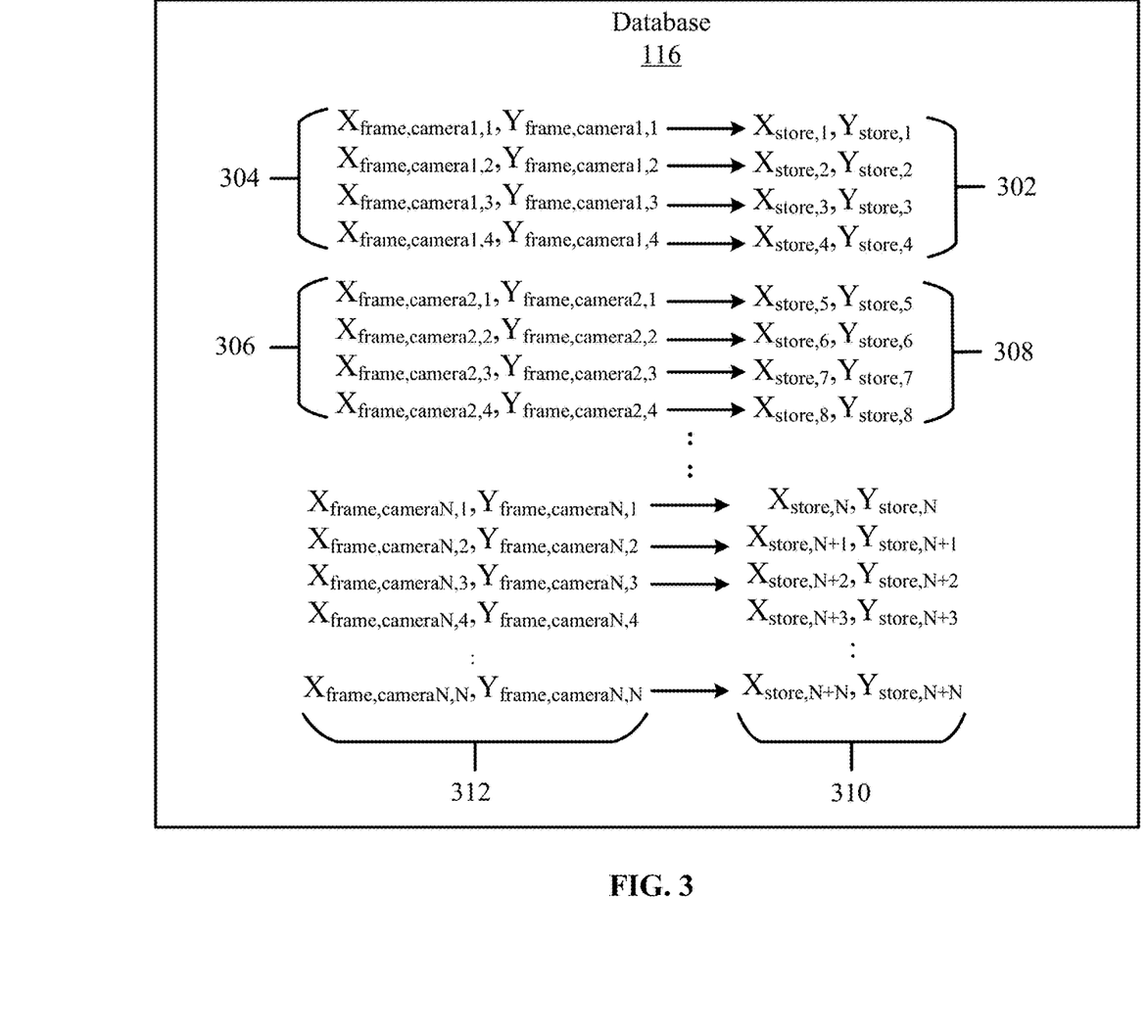
FIG. 3 is a schematic illustration of an exemplary database in accordance with some embodiments.
Figure 4:
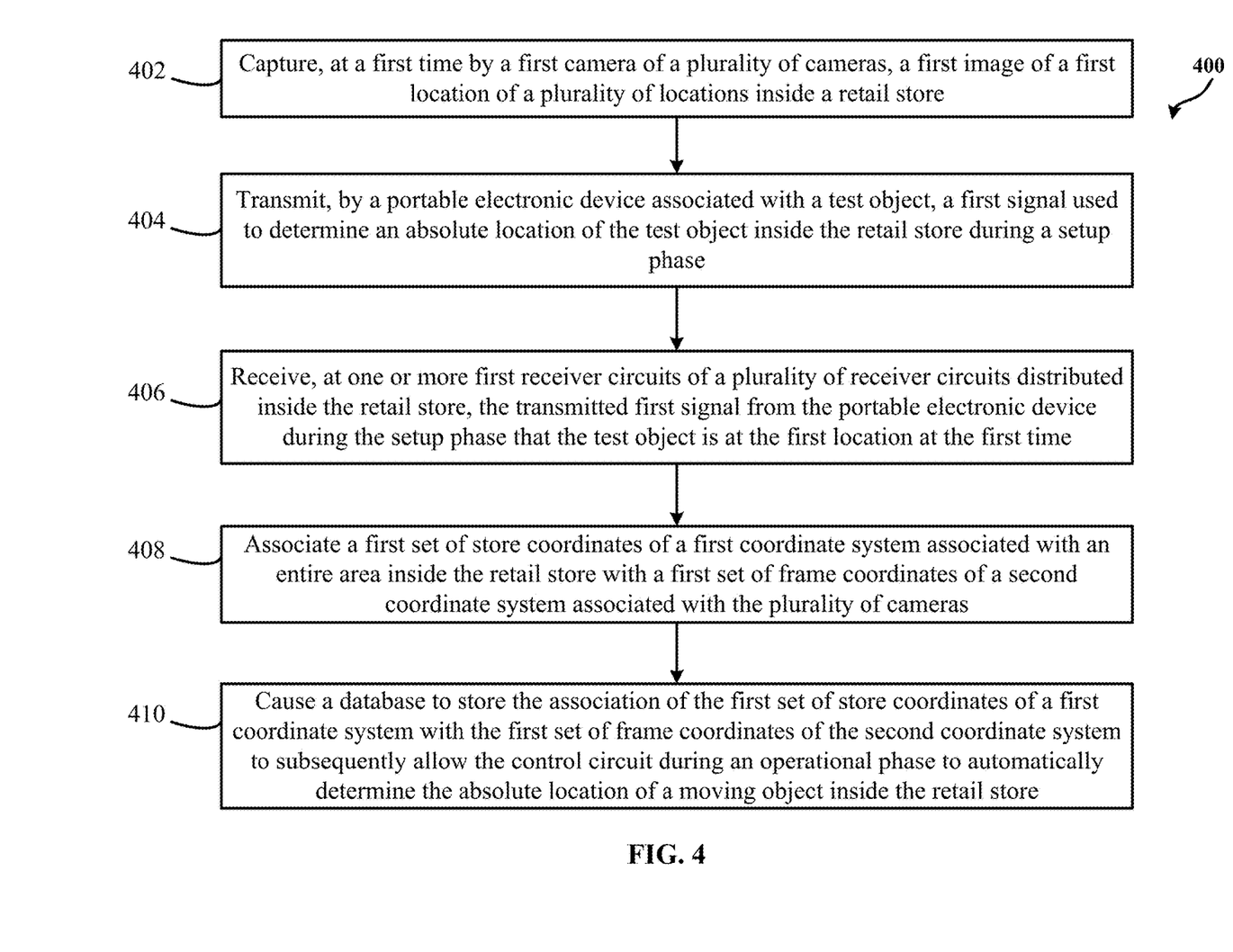
FIG. 4 shows a flow diagram of an exemplary process of automatically determining location of an object inside a retail store in accordance with some embodiments.

To illustrate, FIGS. 1 through 5 are concurrently described below. FIG. 1 illustrates a simplified block diagram of an exemplary system 100 for automatically determining location of an object inside a retail store in accordance with some embodiments. FIG. 2 is a simplified schematic illustration of exemplary coordinate systems 310, 312 in accordance with some embodiments. FIG. 3 is a schematic illustration of an exemplary database 116 in accordance with some embodiments. FIG. 4 shows a flow diagram of an exemplary process/method 400 of automatically determining location of an object inside a retail store in accordance with some embodiments. To illustrate, the system 100 includes a plurality of locations 112 inside a retail store. By one approach, each of the plurality of locations 112 may correspond to a particular area inside the retail store. For example, an area may include a meat area, a produce area, a cashier area, a customer service area, a lounge area, a food court area, an aisle area, a shelf area, an entrance area, an exit area, and/or a bakery area, to name a few. In one configuration, the system 100 may include a first camera 122 of a plurality of cameras 110. By one approach, the first camera 122 may capture, at a first time, a first image of a first location 212 of the plurality of locations 112, at step 402. For example, the plurality of cameras 110 may include a video camera, an acoustic camera, a thermographic camera, a system camera, a still video camera, a subminiature camera, a thermal imaging camera, an autofocus camera, a closed-circuit television camera, a digital camera, a high-speed camera, an IP camera, a webcam, and/or an optical camera, among other types of cameras capable of capturing an image of a scene, an area, an object, a customer, a user, etc. In one example, each location and/or area inside the retail store may be associated with one or more corresponding cameras of the plurality of cameras 110. For example, a first camera 122 may be assigned to a first location 212 (e.g., a bakery area or section) of the store. In one scenario, a field of view of the first camera 122 may include substantially the first location 212. In another example, a field of view of a second camera 124 may include substantially a first portion of the first location 212 while the first camera 122 may include substantially a second portion of the first location 212. As such, each camera of the plurality of cameras 110 may be assigned and/or designated to a particular area/location/and/or section of the retail store. For example, each camera may be associated with a particular/unique identification (ID) (e.g., camera serial number, a MAC ID associated with the camera, a manufacturer assigned ID, and/or a user defined ID). In such an example, an image and/or video captured by a camera of the plurality of cameras 110 may be associated with the corresponding particular/unique identification (ID) of the camera. In some embodiments, to the extent an object is a person, the identity of the person is not determined. And that in some embodiments, consent can be obtained and/or signage or notices would be located near any cameras to inform persons that video footage is being obtained and monitored.

Generally, in some embodiments, the systems and methods described herein can be configured to comply with any applicable privacy requirements which may vary between jurisdictions. For example, before any recording, collection, capturing or processing of user image data, a "consent to capture" process or a notice process may be implemented in some embodiments. In such a process, consent may be obtained in some embodiments, from the human, via a registration process. Part of the registration process may be to ensure compliance with the appropriate privacy laws for the location where the capturing of images of persons would be performed. In some embodiments, a notice process posts, presents, and/or displays notice to persons that image data is being collected. Such notice can be in the form of signage near cameras and/or entrances, and/or notifications by email, text, app notifications, and so on. In such restricting jurisdictions, in some embodiments, no unauthorized collection or processing of image data of individuals occurs via exemplary systems and methods. Once consent is verified and/or adequate notice is provided, image data of persons can be captured, processed and used. Absent verification of consent or notice, in some embodiments, the camera, sensor, and/or other data collection system remains turned off. Once consent is verified or notice is provided, in some embodiments, the camera, sensor and/or other data collection system may be activated or turned on. If any image data is inadvertently captured prior to verification of consent or provision of notice, in some embodiments, the collected data is immediately deleted, not having been saved. In some embodiments, any image data captured as part of the verification or notice process is handled and stored by a single party at a single location. In some other embodiments where data is transmitted to an offsite location for verification, certain disclosures prior to consent or notice may be required, and the image data is encrypted.

Alternatively or in addition to, the system 100 may include a portable electronic device 106. By one approach, the portable electronic device 106 may be associated with a test object 206 during a setup phase. In one configuration, the setup phase may include a period of time when a first coordinate system 310 and/or a second coordinate system 312 are being established, built, and/or created, a period of time when associations of the first coordinate system 310 with the second coordinate system 312 are being determined and/or stored in a database 116, and/or a period of time when functionality of the system 100 are being tested prior to normal operational use. In another configuration, the setup phase may not include an operational period/phase of the system 100. By one approach, an operational period/phase may correspond to a period where the system 100 is in normal operation, performing its daily, assigned, and/or routine function. In some implementations, the test object 206 may include a retail store associate and/or a robot capable of transporting itself throughout the retail store. In other implementations, the portable electronic device 106 may include a smartphone, a laptop, a tablet, an iPad, and/or a tag (e.g., WiFi tag, Bluetooth tag, infrared tag, an radio frequency tag, an acoustic tag, etc.), among other types of electronic device capable of being carried from one area of the retail store to another area of the retail store with ease. In yet another implementation, the portable electronic device 106 may include a smartphone having an application installed to send, receive, provide, and/or emit signal to and/or from the plurality of receiver circuits 104.

By one approach, the portable electronic device 106 may, at step 404, transmit a signal used to determine an absolute location 214 of the test object 206 inside the retail store during a setup phase. Alternatively or in addition to, the system 100 may include one or more first receiver circuits 126 of a plurality of receiver circuits 104 distributed inside the retail store. By one approach, the one or more first receiver circuits 126 may receive transmitted first signals from the portable electronic device 106 during the setup phase when the test object 206 is at a first location 212 at a first time, at step 406. In one scenario, the one or more first receiver circuits 126 may be associated with the first location 212. For example, the plurality of receiver circuits 104 may include a Bluetooth Low Energy beacon, a WiFi wireless access point, an Ultra Wide-Band (UWB) reader, an acoustic reader, an infrared reader, and/or one or more commercially available receiver circuits used for indoor positioning system. In an illustrative non-limiting example, during a setup phase of the system 100, a retail store associate may carry the portable electronic device 106 while traversing inside the retail store. Alternatively, the portable electronic device 106 may be coupled with a robot. In another embodiment, the portable electronic device 106 may include a robot and/or a robotic electronic device capable of transporting itself throughout the inside of the retail store. In such an embodiment, the portable electronic device 106 and the test object 206 may be one and the same. In one example, the retail store associate may walk throughout the retail store while carrying the portable electronic device 106. In one scenario, the portable electronic device 106 may send and/or emit a signal receivable by a first receiver circuit 126. By one approach, the first receiver circuit 126 may provide data to a control circuit 102 in response to receiving the signal from the portable electronic device 106. In one configuration, the data may be associated with the signal and configured to provide a location of the test object 206 and/or the portable electronic device 106 relative to the first receiver circuit 126. In another scenario, the first receiver circuit 126 may provide a signal to the portable electronic device 106. In such a scenario, the portable electronic device 106 may provide data to the control circuit 102 in response to receiving the signal from the first receiver circuit 126. By one approach, the data may be associated with the signal and configured to provide a location of the test object 206 and/or the portable electronic device 106 relative to the first receiver circuit 126. As such, the control circuit 102 may determine an absolute location 214 of the test object 206 and/or the portable electronic device 106 in the retail store based on the data received from the portable electronic device 106 and/or the plurality of receiver circuits 104.

By another approach, the system 100 may include the control circuit 102 communicatively coupled to the first camera 122 and one or more first receiver circuits 126 via a communication network 118. For example, the communication network 118 may include a wired and/or wireless network, a WiFi network, a local area network, and/or a Bluetooth network, among other types of communication networks capable of coupling one electronic device to another one or more electronic devices. In some configurations, during the setup phase and the portable electronic device 106 being at the first location 212, the control circuit 102 may associate, using a first image from the first camera 122 and data from at least one of the one or more first receiver circuits 126 having received the transmitted signals from the portable electronic device 106 when the test object 206 is at the first location 212, a first set 302 of store coordinates 202 of a first coordinate system 310 associated with an entire area inside the retail store with a first set 304 of frame coordinates 204 of a second coordinate system 312 associated with the plurality of cameras 110, at step 408. In such a configuration, the first set 304 of frame coordinates 204 may be associated with a first frame 208 of the first camera 122. Alternatively or in addition to, the control circuit 102 may, at step 410, cause the database 116 to store the association of the first set 302 of store coordinates 202 of the first coordinate system 310 with the first set 304 of frame coordinates 204 of the second coordinate system 312 to subsequently allow the control circuit 102 during an operational phase to automatically determine the absolute location 214 of a moving object inside the retail store. By one approach, the operational period/phase may correspond to a period where the system 100 is in normal operation, performing its daily, assigned, and/or routine function. In some implementations, the absolute location 214 of a moving object inside the retail store may be automatically determined by performing a lookup in the database 116 of the absolute location 214 of the moving object using and/or based on a pixel location 216 corresponding to the moving object in a frame 208 of a particular camera associated with a current location of the moving object in the retail store.

In an illustrative non-limiting example, during the setup phase, the test object 206 may be at the first location 212 (e.g., automotive area). By one approach, the portable electronic device 106 associated with the test object 206 may provide a signal to the first receiver circuit 126. In one configuration, the control circuit 102 may receive data associated with the signal and determine, based on the received data, the absolute location 214 of the test object 206 inside the retail store. For example, the absolute location 214 may include $X_{store,1}, Y_{store,1}$ of the first set 302 of store coordinates 202 of the first coordinate system 310. In one illustrative non-limiting example, the control circuit 102 may be programmed to know the location of each of the plurality of receiver circuits 104 in the retail store based on a first grid 210 associated with the store coordinates 202. In one configuration, the control circuit 102 may estimate the location of the portable electronic device 106 in the retail store based on a determined signal strength of the signal received from the portable electronic device 106. By one approach, the plurality of receiver circuits 104 and/or the control circuit 102 may determine the signal strength of the signal received from the portable electronic device 106. In yet another configuration, the portable electronic device 106 may determine the signal strength of the signals received from one or more of the plurality of receiver circuits 104 prior to sending data to the control circuit 102, where the data is associated with the signals and configured to provide a location of the test object 206 and/or the portable electronic device 106 relative to the first receiver circuit 126. In yet another configuration, the control circuit 102 may perform commercially known triangulation techniques and/or signal processing using the plurality of receiver circuits and/or the portable electronic device 106. As such, the system 100 and/or the control circuit 102 may establish, build and/or create the first coordinate system 310 associated with the entire area inside the retail store based on the determined absolute location 214 of the test object 206 as the test object 206 traverses throughout the entire retail store. In some embodiments, the control circuit 102 may determine a location in the retail store and identify the location as the origin of the first coordinate system 310. In one example, the origin may include the center location of the retail store, a corner location of the retail store, among other locations in the retail store that may be suitable and/or desirable to establish as the origin of the first coordinate system 310.

Alternatively or in addition to, the control circuit 102 may receive an image of the first location 212 captured by the first camera 122 while the test object 206 is at the first location 212. By one approach, the receipt of the image by the control circuit 102 may be simultaneous with and/or substantially in close proximity in time with the control circuit's 102 receipt of the data associated with the signal provided by the portable electronic device 106 to the first receiver circuit 126. By another approach, a first timestamp may be associated with the image received by the control circuit 102. Alternatively or in addition to, a second timestamp may be associated with the data associated with the signal provided by the portable electronic device 106 to the first receiver circuit 126. In one example, the control circuit 102 may determine which data associated with the signal provided by the portable electronic device 106 to associate with images captured by a particular camera of the plurality of cameras 110 by comparing the first timestamp with the second timestamp and/or determining whether the first and second timestamps are substantially in close proximity in time with one another. In one configuration, the association of the first timestamp may be performed by the control circuit 102 and/or the plurality of cameras 110. In another configuration, the association of the second timestamp may be performed by the control circuit 102, the portable electronic device 106, and/or the plurality of receiver circuits 104.

In some implementations, the frame 208 of the captured image may include a plurality of pixels. In such an implementation, the frame 208 may include the first set 304 of frame coordinates 204. For example, the pixel location 216 corresponding to the test object 206 in the frame 208 may include $X_{frame,camera1,1}, Y_{frame,camera1,1}$ of the first set 304 of frame coordinates 204 of the second coordinate system 312. As such, the pixel location 216 may include an x,y coordinate of the second coordinate system 312 in which the x,y coordinate is associated with the first camera 122. As such, the system 100 and/or the control circuit 102 may build and/or create the second coordinate system 312 associated with the plurality of frames of the plurality of cameras 110 based on the determined pixel location 216 of the test object 206 in the frame 208 while the test object 206 traverses throughout the entire retail store and the corresponding images are captured by the corresponding cameras 110. In some implementations, as the control circuit 102 determines the absolute location 214 and the pixel location 216, the control circuit 102 may associate the absolute location 214 with the pixel location 216 and/or store the association in the database 116. For example, the control circuit 102 may associate $X_{frame,camera1,1}, Y_{frame,camera1,1}$ with $X_{store,1}, Y_{store,1}$ and store the association in the database 116. Those skilled in the art will recognize that the x,y coordinates of the first coordinate system 310 and the second coordinate system 312 can be represented, notated, illustrated, displayed, coded, programmed in various ways and combinations with respect to the described embodiments herein without departing from the scope of the invention, and that those are to be viewed as being within the ambit of the inventive concept.

Alternatively or in addition to, the control circuit 102 may receive an image of the first location 212 captured by the first camera 122 while the test object 206 is at the first location 212. By one approach, the test object 206 may navigate inside the retail store following a predefined path in order to cover as much a walking area/path as covered by the plurality of cameras 110. In one configuration, the portable electronic device 106 may record the walking area/path in the following format: 2DWalkingPath={(x, y, timestamp), (x, y, timestamp), . . . }. In another configuration, the control circuit 102 may run video tracking processing and/or algorithm on images and/or videos captured by the first camera 122 with the test object 206 at the first location 212. In response, the control circuit 102 may extract the following data: ObjectTackingPosition={(cameraID, Px, Py, timestamp), (cameraID, Px, Py, timestamp), . . . }. Alternatively or in addition to, the control circuit 102 may align recorded "2DWalkingPath" and "ObjectTackingPosition" using the timestamp in order to generate a compiled lookup table as following: ObjectProjectionMap={(cameraID, Px, Py, x, y), (cameraID, Px, Py, x, y), . . . }. By one approach, the compiled lookup table may be stored in the database 116. Alternatively or in addition to, based on initialized and/or stored "ObjectProjectionMap", any moving objects detected by the plurality of cameras 110 during the operational period/phase having a determined Px, Py frame coordinates may be able to get the corresponding 2D position store coordinates.

In some implementations, a second camera 124 of the plurality of cameras 110 may capture, during the setup phase, a third image of a second location of the plurality of locations 112. By one approach, one or more second receiver circuits 128 of the plurality of receiver circuits 104 may receive transmitted second signals from the portable electronic device 106 during the setup phase and when the test object 206 is at the second location at a second time. In one configuration, the one or more second receiver circuits 128 may be associated with the second location. In such a configuration, the control circuit 102 may associate, using the third image from the second camera 124 and data from at least one of the one or more second receiver circuits 128 having received the transmitted signals from the portable electronic device 106 when the test object 206 is at the second location, a second set 308 of store coordinates 202 of the first coordinate system 310 associated with the entire area inside the retail store with a second set 306 of frame coordinates 204 of the second coordinate system 312 associated with the plurality of cameras 110. By one approach, the second set 306 of frame coordinates 312 may be associated with a second frame of the second camera 124. Alternatively or in addition to, the control circuit 102 may cause the database 116 to store the association of the second set 308 of store coordinates 202 of the first coordinate system 310 with the second set 306 of frame coordinates 204 of the second coordinate system 312. For example, the absolute location 214 of the test object 206 in the second location may include $X_{store,7}, Y_{store,7}$ while the pixel location 216 of the test object 206 in the second frame may include $X_{frame,camera2,3}, Y_{frame,camera2,3}$. In such an example, the control circuit 102 may associate $X_{store,7}, Y_{store,7}$ with $X_{frame,camera2,3}, Y_{frame,camera2,3}$ and store the association in the database 116. As such, by one approach, at the completion of the setup phase, an inside map of the retail store may be rendered into the first grid 210, where a particular absolute location 214 may be represented and/or correspond to one or more squares in the first grid 210. Alternatively or in addition to, an image captured by one of the plurality of cameras 110 may correspond to a frame 208 that is rendered into a second grid 218, where a particular pixel location 216 of the frame 208 may be represented and/or correspond to one or more squares in the second grid 218. In some implementations, each pixel location 216 of a frame 208 of each of the plurality of cameras 110 may be associated with a particular absolute location 214 in the database 116.

In some embodiments, during an operation period/phase, the control circuit 102 may receive a second image of the first location 212 captured by the first camera 122. For example, a moving object (e.g., a customer, an electronic cart and/or robot configured to shop for a customer, to name a few) may be at the first location 212 (e.g., a meat area of the retail store). By one approach, the first camera 122 may capture an image of the moving object at the first location 212. In one scenario, the captured image may be received by the control circuit 102. In such a scenario, the control circuit 102 may determine the x,y frame coordinate corresponding to the pixel location 216 of the moving object in the frame 208 of the captured image. In one configuration, in response to the determination of the x,y frame coordinate corresponding to the pixel location 216 of the moving object, the control circuit 102 may perform a lookup of the corresponding absolute location 214 of the determined x,y frame coordinate of the moving object in the database 116. As such, the control circuit 102 may automatically determine the absolute location 214 of the moving object inside the retail store based on the received second image and the stored association of the first set of store coordinates 202 with the first set of frame coordinates 204. In such a scenario, a second image may be captured when the moving object is at the first location 212 during the operational period/phase. Thus, through the use of the first coordinate system 310, the second coordinate system 312, and/or the stored association of each pixel location 216 with the absolute location 214, the system 100 may automatically determine the location of an object inside a retail store without performing as extensive of data crunching and/or processing that is conventionally done by conventional systems in real-time. As such, the processing power and/or throughput typically required of a system that determines a location of an object in real time may be reduced by the embodiments described herein.

In some embodiments, the system 100 may include a display monitor 108. By one approach, the display monitor 108 may be coupled with the control circuit 102 via the network 118. In some configurations, the display monitor 108 may be associated with the first location 212. In such a configuration, the display monitor 108 may show an advertising data associated with at least a retail item found in the first location 212. For example, during the operational period/phase, a customer may be at a produce area in a retail store where different varieties of herbs can be found. By one approach, the first camera 122 assigned to the produce area may capture an image of the customer being at the produce area. In one configuration, the control circuit 102 may determine the absolute location 214 of the customer based on the pixel location 216 of the customer in the frame 208 of the captured image. In such a configuration, the control circuit 102 may determine the pixel location 216 of the customer in the frame 208 of the captured image. In response, the control circuit 102 may determine the corresponding x,y frame coordinate associated with the pixel location 216. By one approach, the database 116 may be accessed by the control circuit 102 to determine the x,y store coordinate associated with the x,y frame coordinate of the pixel location 216. In such an approach, based on the determined x,y store coordinate, the control circuit 102 may determine the absolute location 214 of the customer in the produce area. By one approach, the database 116 may include a random access memory (RAM), a read only memory (ROM), magnetic based storage devices, optical storage media, cloud storage, hard disk drive, optical disk drive, a solid-state drive, one or more of universal serial bus (USB) stick or drive, and/or a flash memory secure digital (SD) card, among other types of storage medium capable of storing electronic data.

In some implementations, in response to determining the absolute location 214 of the customer, the control circuit 102 may cause the display monitor to show an advertising data associated with at least a retail item found in the first location 212. For example, the display monitor 108 may display an advertising data associated with rosemary herbs. In some configurations, the advertising data may be associated with one or more retail items within proximity to the absolute location 214 of the customer. In another implementations, in response to the determination of the absolute location 214 of the customer, the control circuit 102 may provide a customized advertising data to a customer electronic device 120 associated with the customer. In some configuration, the customer electronic device 120 may include a smartphone, a laptop, a tablet, a smartwatch, and/or an iPad, among other types of portable electronic devices capable of being carried from one location to another location with ease. For example, the customer electronic device 120 may have an application that may couple to the control circuit 102 when the customer electronic device 120 is in the retail store. In one example, the control circuit 102 may send customized advertising data to the customer electronic device 120 based on the determined absolute location 214 of the customer in the retail store. As such, the customized advertising data may be associated with at least a retail item found in the first location 212. In some implementations, the control circuit 102 may provide a map (e.g., 2-dimensional and/or 3-dimenstional) of the retail store and/or cause the customer electronic device 120 to show and/or display the map. In such an embodiment, the map may indicate the absolute location 214 of the customer relative to the retail store map.

In some embodiments, the system 100 may include a QR code image 114 placed in an area at the first location 212. For example, the QR code image 114 may be used to periodically calibrate the first camera 122 during the operational period/phase. In one configuration, the QR code image 114 may be located at a predefined absolute location 214 in the first location 212. By one approach, the first camera 122 may capture a reference image of the QR code image 114 placed in the area at the first location 212 during the setup phase. In such an approach, based on the captured reference image, the control circuit 102 may determine a set of initial frame coordinates 204 of one or more corners of the QR code image 114. Alternatively or in addition to, the control circuit 102 may cause, during the setup phase, the database 116 to store the determined set of initial frame coordinates 204 of the one or more corners of the QR code image 114 as reference frame coordinates. As such, during a calibration phase, the control circuit 102 may determine current frame coordinates of the one or more corners of the QR code image 114 based on a current image of the QR code image 114 captured by the first camera 122. Alternatively or in addition to, the control circuit 102 may determine, during the calibration phase, that the current frame coordinates do not match the reference frame coordinates. By one approach, in response to the determination that the current frame coordinates do not match the reference frame coordinates, the control circuit 102 may provide, during the calibration phase, an alert message to calibrate the first camera 122.

In an illustrative non-limiting example, during the setup phase, the control circuit 102 may determine the reference frame coordinates (e.g., $X_{frame,camem1,17}$, $Y_{frame,camem1,17}$, $X_{frame,camera1,31}$, $Y_{frame,camera1,9}$, $X_{frame,camera1,17}$, $Y_{frame,camera1,9}$, and/or $X_{frame,camera1,31}$, $Y_{frame,camera1,17}$). By one approach, the reference frame coordinates may include frame coordinates 204 corresponding to two opposite corners of the QR code image 114, one corner of the QR code image 114, three or four corners of the QR code image 114, and/or any combination of one or more corners of the QR code image 114. In one configuration, during the calibration phase, the control circuit 102 may determine that current frame coordinates of the QR code image 114 do not match the reference frame coordinates. For example, the determined current frame coordinates may correspond to $X_{frame,camera1,17}$, $Y_{frame,camera1,20}$, $X_{frame,camem1,31}$, $Y_{frame,camera1,12}$, $X_{frame,camera1,17}$, $Y_{frame,camera1,12}$, and/or $X_{frame,camera1,31}$, $Y_{frame,camera1,20}$. In such an example, the control circuit 102 may determine that first camera 122 may need to be adjusted since the current frame coordinates of the QR code image 114 is shifted up (and in some other cases, shift down, sideways, left and/or right, and/or diagonally). In some implementation, the control circuit 102 may provide an alert message to an electronic device of a retail associate indicating that the first camera 122 may need to be recalibrated. By one approach, the calibration may include software adjustment and/or physical adjustment to match the current frame coordinates with the reference frame coordinates. For example, software adjustment may include providing an adjustment data to the control circuit 102 to enable the control circuit 102 to incorporate the adjustment data when the absolute location 214 is determined.

In some embodiments, the QR code image 114 may be setup and/or printed for each of the plurality of cameras 110 with a unique identification (ID). By one approach, the QR code image 114 may be placed at a portion of the first location 212 capturable, detectable, and/or recognizable by the first camera 122. In some implementations, the control circuit 102 may record the (Px, Py) frame coordinates and/or position of the 4 corners of QR code image 114 for each of the plurality of cameras 110 as cameraQRCodePosition. During the calibration phase, the control circuit 102 may go through a predefined process for each of the plurality of cameras 110. In some configurations, the predefined process may include checking, by the control circuit 102, basic features of each camera (e.g., resolution, zoom, etc.) and/or verifying that the setup are the same as previously recorded camera feature data during the setup phase. In one example, the control circuit 102 may detect the QR code image 114 and/or match with the unique ID associated with the corresponding camera of the plurality of cameras 110. Alternatively or in addition to, the control circuit 102 may detect (Px,Py) frame coordinates and/or positions for one or more corners of the QR code image 114 and/or compare with recorded and/or reference frame coordinates. In some implementations, if the frame coordinates and/or positions are changed, the control circuit 102 may calculate transformation of the changes and/or the differences between the current frame coordinates and/or positions and the recorded and/or reference frame coordinates and/or positions. In response, the control circuit 102 may recalculate initialized and/or stored "ObjectProjectionMap". Alternatively or in addition to, the control circuit 102 may re-execute steps performed during the setup phase as described above.

Figure 5:
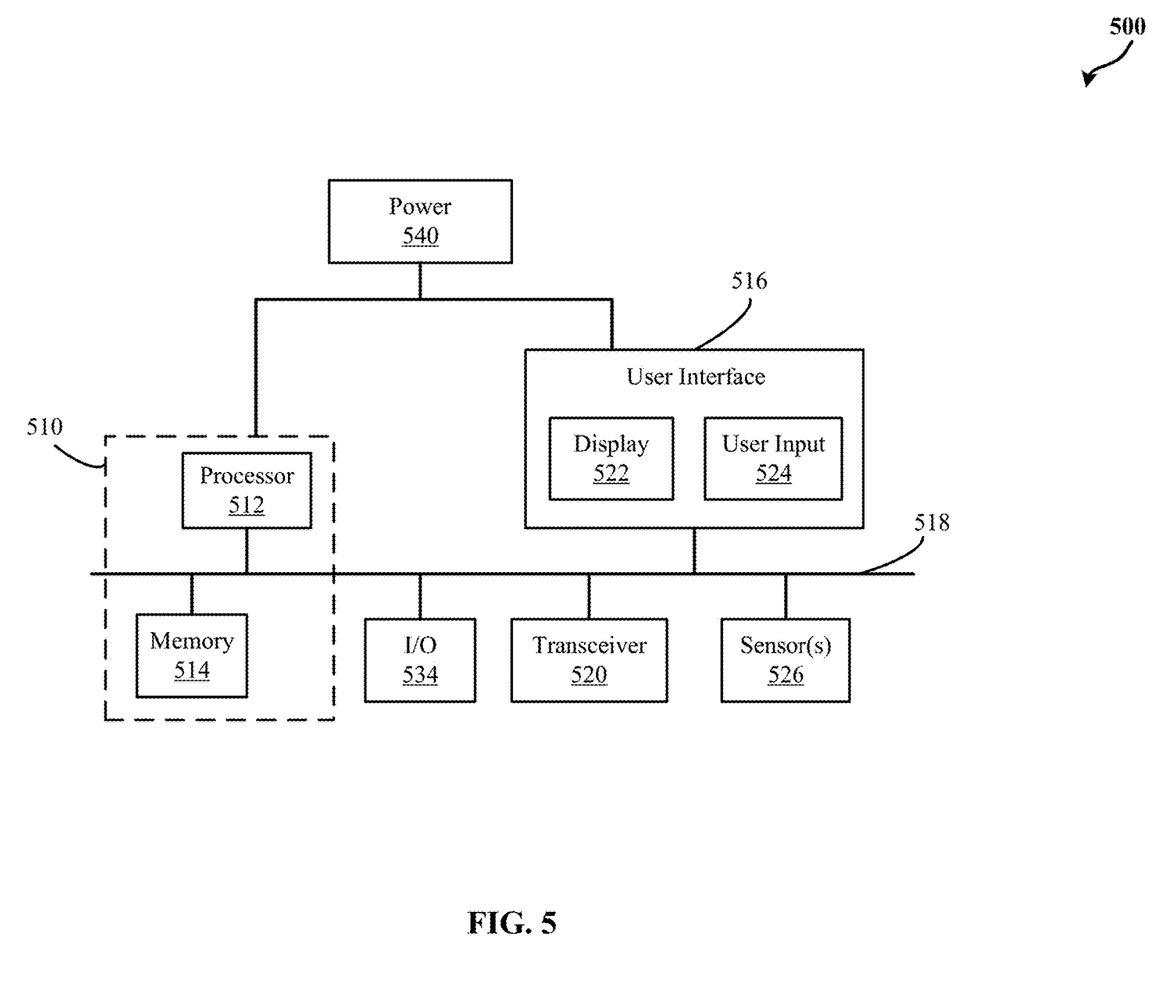
FIG. 5 illustrates an exemplary system for use in implementing methods, techniques, devices, apparatuses, systems, servers, sources and in automatically determining location of an object inside a retail store, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, the method 400 of FIG. 4, and/or other above or below mentioned systems or devices, or parts of such circuits, circuitry, functionality, systems, apparatuses, processes, or devices. For example, the system 500 may be used to implement some or all of the system for automatically determining location of an object inside a retail store of system 100, the plurality of cameras 110, the control circuit 102, the portable electronic device 106, the plurality of receiver circuits 104, the database 116, the display monitor 108, the customer electronic device 120, and/or other such components, circuitry, functionality and/or devices. However, the use of the system 500 or any portion thereof is certainly not required.

By way of example, the system 500 may comprise a processor module (or a control circuit) 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system 500 may implement the system for automatically determining location of an object inside a retail store with the control circuit 102 being the control circuit 512.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) interface 534 that allow one or more devices to couple with the system 500. The I/O interface can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the plurality of cameras 110, the control circuit 102, the portable electronic device 106, the plurality of receiver circuits 104, the database 116, the display monitor 108, the customer electronic device 120, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for automatically determining location of an object inside a retail store via one or more cameras, the system comprising:
   a plurality of locations inside an area of interest a retail store;
   a first camera of a plurality of cameras capturing, at a first time, a first image of a first location of the plurality of locations;
   a portable electronic device associated with a test object and configured to transmit a signal used to determine an absolute location of the test object inside the retail store during a setup phase;
   one or more first receiver circuits of a plurality of receiver circuits distributed inside the retail store configured to receive transmitted first signals from the portable electronic device during the setup phase when the test object is at the first location at the first time, wherein the one or more first receiver circuits are associated with the first location; and
   a control circuit communicatively coupled to the first camera and the one or more first receiver circuits, wherein during the setup phase and the portable electronic device being at the first location, the control circuit is configured to:
      associate, using the first image from the first camera and data from at least one of the one or more first receiver circuits having received the transmitted first signals from the portable electronic device when the test object is at the first location, a first set of store coordinates of a first coordinate system associated with an entire area inside the retail store with a first set of frame coordinates of a second coordinate system associated with the plurality of cameras, wherein the first set of frame coordinates is associated with a first frame of the first camera;
   cause a database to store the association of the first set of store coordinates of the first coordinate system with the first set of frame coordinates of the second coordinate system; and
   cause the control circuit to automatically determine an absolute location of a moving object inside the retail store by performing a lookup in the database of the absolute location of the moving object using a pixel location corresponding to the moving object in a frame of a particular camera associated with a current location of the moving object in the retail store.

2. The system of claim 1, further comprising:
   a second camera of the plurality of cameras capturing, during the setup phase, a third image of a second location of the plurality of locations; and
   one or more second receiver circuits of the plurality of receiver circuits configured to receive transmitted second signals from the portable electronic device during the setup phase and when the test object is at the second location at a second time, wherein the one or more second receiver circuits are associated with the second location, wherein the control circuit is further configured to:

associate, using the third image from the second camera and data from at least one of the one or more second receiver circuits having received the transmitted second signals from the portable electronic device when the test object is at the second location, a second set of store coordinates of the first coordinate system associated with the entire area inside the retail store with a second set of frame coordinates of the second coordinate system associated with the plurality of cameras, wherein the second set of frame coordinates is associated with a second frame of the second camera; and cause the database to store the association of the second set of store coordinates of the first coordinate system with the second set of frame coordinates of the second coordinate system.

3. The system of claim 1, wherein each of the plurality of locations correspond to a particular area inside the retail store, and wherein the particular area comprises a meat area, a produce area, a cashier area, a customer service area, a lounge area, a food court area, an aisle area, a shelf area, an entrance area, an exit area, and a bakery area.

4. The system of claim 1, wherein the control circuit is further configured to: receive a second image of the first location captured by the first camera; and automatically determine the absolute location of the moving object inside the retail store based on the received second image and the stored association of the first set of store coordinates with the first set of frame coordinates, wherein the second image is captured when the moving object is at the first location.

5. The system of claim 4, further comprising a display monitor associated with the first location, the display monitor configured to show an advertising data associated with at least a retail item found in the first location.

6. The system of claim 5, wherein, in response to the determination of the absolute location of the moving object, the control circuit is further configured to cause the display monitor to show the advertising data associated with at least the retail item found in the first location.

7. The system of claim 4, wherein, in response to the determination of the absolute location of the moving object, the control circuit is further configured to provide a customized advertising data to a customer electronic device associated with the moving object, wherein the customized advertising data is associated with at least a retail item found in the first location.

8. The system of claim 1, further comprising a QR code image placed in an area at the first location, wherein the QR code image is used to periodically calibrate the first camera during an operational phase.

9. The system of claim 8, wherein the first camera captures a reference image of the QR code image placed in the area at the first location during the setup phase, and wherein the control circuit is further configured to:

determine, during the setup phase, initial frame coordinates of one or more corners of the QR code image based on the reference image;

cause, during the setup phase, the database to store the initial frame coordinates of the one or more corners of the QR code image as reference frame coordinates;

determine, during a calibration phase, current frame coordinates of the one or more corners of the QR code image based on a current image of the QR code image captured by the first camera;

determine, during the calibration phase, that the current frame coordinates do not match the reference frame coordinates; and in response to the determination that the current frame coordinates do not match the reference frame coordinates, provide, during the calibration phase, an alert message to calibrate the first camera.

10. The system of claim 9, wherein calibration of the first camera comprises at least one of software adjustment and physical adjustment to match the current frame coordinates with the reference frame coordinates.

11. A method for automatically determining location of an object inside a retail store via one or more cameras, the method comprising:

capturing, at a first time by a first camera of a plurality of cameras, a first image of a first location of a plurality of locations inside a retail store;

transmitting, by a portable electronic device associated with a test object, a first signal used to determine an absolute location of the test object inside the retail store during a setup phase;

receiving, at one or more first receiver circuits of a plurality of receiver circuits distributed inside the retail store, the transmitted first signal from the portable electronic device during the setup phase that the test object is at the first location at the first time, wherein the one or more first receiver circuits are associated with the first location;

associating at a control circuit communicatively coupled to the first camera and the one or more first receiver circuits, using the first image from the first camera and data from at least one of the one or more first receiver circuits having received the transmitted first signal from the portable electronic device when the test object is at the first location, a first set of store coordinates of a first coordinate system associated with an entire area inside the retail store with a first set of frame coordinates of a second coordinate system associated with the plurality of cameras, wherein the first set of frame coordinates is associated with a first frame of the first camera;

causing, by the control circuit, a database to store the association of the first set of store coordinates of a first coordinate system with the first set of frame coordinates of the second coordinate system; and causing, by the control circuit, automatic determination of an absolute location of a moving object inside the retail store by performing a lookup in the database of the absolute location of the moving object using a pixel location corresponding to the moving object in a frame of a particular camera associated with a current location of the moving object in the retail store.

12. The method of claim 11, further comprising:

capturing, during the setup phase and by a second camera of the plurality of cameras, a third image of a second location of the plurality of locations;

receiving, by one or more second receiver circuits of the plurality of receiver circuits, a second signal transmitted by the portable electronic device during the setup phase and when the test object is at the second location at a second time;

associating by the control circuit, using the third image from the second camera and data from at least one of the one or more second receiver circuits having received the transmitted second signal from the portable electronic device when the test object is at the second location, a second set of store coordinates of the first coordinate system associated with the entire area inside the retail store with a second set of frame coordinates of the second coordinate system associated with the plurality of cameras, wherein the second set of frame coordinates is associated with a second frame of the second camera; and causing, by the control circuit, the database to store the association of the second set of store coordinates of the first coordinate system with the second set of frame coordinates of the second coordinate system.

13. The method of claim 11, wherein each of the plurality of locations correspond to a particular area inside the retail store, and wherein the particular area comprises a meat area, a produce area, a cashier area, a customer service area, a lounge area, a food court area, an aisle area, a shelf area, an entrance area, an exit area, and a bakery area.

14. The method of claim 11, further comprising: receiving, by the control circuit, a second image of the first location captured by the first camera; and automatically determining, by the control circuit, the absolute location of the moving object inside the retail store based on the received second image and the stored association of the first set of store coordinates with the first set of frame coordinates, wherein the second image is captured when the moving object is at the first location.

15. The method of claim 14, further comprising showing, by a display monitor associated with the first location, an advertising data associated with at least a retail item found in the first location.

16. The method of claim 15, further comprising causing, by the control circuit, the display monitor to show the advertising data associated with at least the retail item found in the first location in response to determining the absolute location of the moving object.

17. The method of claim 14, further comprising providing, by the control circuit, a customized advertising data to a customer electronic device associated with the moving object in response to determining the absolute location of the moving object, wherein the customized advertising data is associated with at least a retail item found in the first location.

18. The method of claim 11, further comprising periodically calibrating, during an operational phase and by the control circuit, the first camera using a QR code image placed in an area in the first location.

19. The method of claim 18, further comprising:

capturing, during the setup phase and by the first camera, a reference image of the QR code image placed in the area at the first location;

determining, during the setup phase and by the control circuit, initial frame coordinates of one or more corners of the QR code image based on the reference image;

causing, during the setup phase and by the control circuit, the database to store the initial frame coordinates of the one or more corners of the QR code image as reference frame coordinates;

determining, during a calibration phase and by the control circuit, current frame coordinates of the one or more corners of the QR code image based on a current image of the QR code image captured by the first camera;

determining, during the calibration phase and by the control circuit, that the current frame coordinates do not match the reference frame coordinates; and in response to determining that the current frame coordinates do not match the reference frame coordinates, providing, during the calibration phase and by the control circuit, an alert message to calibrate the first camera.

20. The method of claim 19, wherein calibration of the first camera comprises at least one of software adjustment and physical adjustment to match the current frame coordinates with the reference frame coordinates.

* * * * *

UNITED STATES PATENT AND TRADEMARK OFFICE
CERTIFICATE OF CORRECTION

PATENT NO. : 11,417,104 B2
APPLICATION NO. : 17/087432
DATED : August 16, 2022
INVENTOR(S) : Yanbin Ye and Zhichun Xiao It is certified that error appears in the above-identified patent and that said Letters Patent is hereby corrected as shown below:

In the Claims

Claim 1, Column 14, Line 16, after "inside", delete "an area of interest", therefor.

Signed and Sealed this
Nineteenth Day of December, 2023

Katherine Kelly Vidal
*Director of the United States Patent and Trademark Office*